H. S. HALLWOOD.
CASH REGISTER, INDICATOR, AND RECORDER.
APPLICATION FILED MAR. 16, 1907.

1,086,170.

Patented Feb. 3, 1914.
5 SHEETS—SHEET 1.

Fig. 1

WITNESSES:
G. M. Gridley
Emilie Smith

INVENTOR.
Henry S. Hallwood

H. S. HALLWOOD.
CASH REGISTER, INDICATOR, AND RECORDER.
APPLICATION FILED MAR. 16, 1907.

1,086,170.

Patented Feb. 3, 1914.

H. S. HALLWOOD.
CASH REGISTER, INDICATOR, AND RECORDER.
APPLICATION FILED MAR. 16, 1907.

1,086,170.

Patented Feb. 3, 1914.

WITNESSES:

INVENTOR.
Henry S. Hallwood

H. S. HALLWOOD.
CASH REGISTER, INDICATOR, AND RECORDER.
APPLICATION FILED MAR. 16, 1907.

1,086,170.

Patented Feb. 3, 1914.
5 SHEETS—SHEET 4.

WITNESSES:
G. M. Gridley
Emilie Smith

INVENTOR.
Henry S. Hallwood

H. S. HALLWOOD.
CASH REGISTER, INDICATOR, AND RECORDER.
APPLICATION FILED MAR. 16, 1907.

1,086,170.

Patented Feb. 3, 1914

WITNESSES:

INVENTOR.
Henry S. Hallwood

UNITED STATES PATENT OFFICE.

HENRY S. HALLWOOD, OF COLUMBUS, OHIO, ASSIGNOR, BY MESNE ASSIGNMENTS, TO ANNIE HALLWOOD, OF COLUMBUS, OHIO.

CASH REGISTER, INDICATOR, AND RECORDER.

1,086,170.   Specification of Letters Patent.   Patented Feb. 3, 1914.

Application filed March 16, 1907. Serial No. 362,755.

*To all whom it may concern:*

Be it known that I, HENRY S. HALLWOOD, a citizen of the United States, residing at Columbus, in the county of Franklin, in the State of Ohio, have invented a certain new and valuable Improvement in Cash Registers, Indicators, and Recorders, of which the following is a description, reference being had to the accompanying drawings, which form a part of the application.

The distinctive purpose of this invention is to modify some of the minor details of the Hallwood constructions, whereby the same may be manufactured and used absolutely free from infringement.

The first object of my invention is to provide improved means whereby the operator is compelled to depress a key of each class with which the machine may be provided before a transaction can be registered, screened, indicated or recorded.

The second object of my invention is to provide, in registers having a plurality of series of keys, such as value, initial and department keys, suitable interlocking mechanism between the keys of the different series, such mechanism requiring the operation of both an initial and a department key, in conjunction with a value key or keys representing the amount of the transaction, before the machine can be operated. Such interlocking mechanism also controls a "change" or "no sale" key, the same being preferably included in the series of department release keys and being normally undepressible, the same being released or rendered depressible upon the operation of a clerk's initial key, unless such operation has been accompanied by the operation of a value key, in which event the no-sale key is rendered entirely undepressible for that operation of the machine. By the means of this interlocking mechanism, a correct and complete indication, registration and record is compelled at each operation of the machine, the indicators and recorder showing not only the character of the transaction and the amount involved, but disclosing the identity of the clerk responsible for the transaction.

The third object of my invention is to provide for a simple form of full stroke mechanism, adapted to prevent the retraction of any release key after its partial depression, and to thereby require the full depression of a partially depressed release key so that the completion of each particular transaction is imperative before the machine can be again operated.

The fourth object of my invention is to provide a screen or shutter adapted to conceal the target indications until the act of registration is complete, thereby compelling the clerks to promptness in returning the partially operated parts to normal position.

The fifth object of my invention is to eliminate the so called main yoke from the construction of the said Hallwood cash register, which yoke has heretofore been used for imparting movement in one direction to the elements in turning the counters and indicators.

The sixth object of my invention is to eliminate the positive coupling devices between the indicator operating levers and their respective yokes, it having been assumed heretofore that such devices are desirable for preventing a possible overthrow of the indicator wheels.

The seventh object of my invention is to combine in one machine the hand lever mode of operation with the cash drawer mode of operation whereby the operator may leave the cash drawer in its open position and perform the transactions on the machine by means of the hand lever or he may perform such transactions by the means of the cash drawer, means being provided whereby the hand lever may be disconnected from the machine when the transactions are being performed by the cash drawer.

The eighth object of my invention is to provide means for preventing the too rapid operation of the machine and to thus make it impossible to give the parts such an impetus as will cause them to be carried too far or overthrown due to their momentum.

The ninth object of my invention is to provide improved means for controlling the detents for the keys, the detents being supported upon movable means that are so displaced upon the initial movement of a release key as to effectually lock all keys in the positions they may then occupy.

The tenth object of my invention is to provide improved means for controlling the adding pawls, whereby said pawls are effectually locked to their respective adding wheels at all times except during the time intervening between the depression of a release key and the beginning of a movement of the operating parts toward their return or normal positions.

The above and other objects of the invention will be more fully set forth in the following specification, which is descriptive of the accompanying drawings, in which—

Fig. 2 is a vertical, transverse section on a plane at the right of the department bank of keys, showing the drawer release and resetting mechanism, and also the means for positively removing the reciprocating lock bolts into and out of engagement with the adding wheels, Fig. 2ª is a detail view in perspective of the shutter operating bar.

*General description.*—In the following description of the construction and operation of the various parts of the machine, the same characters indicate identical parts throughout.

1 denotes the outside frames and 1ª the center frame, all of which are firmly secured to the upper base plate 1ᵇ, 2 is the main shaft fixed in its bearings in the left side frame 1 and the center frame 1ª. Upon this shaft the stepped sectors 3 are loosely mounted, 2ª is an oscillatory extension of shaft 2, having its bearings in the right side frame 1 and in the recessed end of shaft 2, which is bored out for that purpose; 4 is a shaft fixed in the frames 1 and 1ª to carry the indicators 5; 6 is a shaft journaled in frames 1 and 1ª to carry the sector gears 7 that operate the indicators 5; 8 is a flash or blind for concealing the indicator wheels during the operation of the machine; 9 designates the value keys, 10 the clerk's initial keys and 11 the department release keys; 12 represents the adding wheels; 12ª, the handle by which the adding wheels 12 are turned to zero; 13 is the cash drawer; 14 is the printing device; 15 is the type carrying sectors; 16 is the sector which operates the inking and tape feeding devices of the printer through the pinion 16ª; 17 represents the yokes which are set in position by the rotation of the stepped sectors 3 and control the position of the type carrying sectors 15, the adding wheels 12 and the indicators 5.

To enable the attendant to return the partially operated mechanism to normal position at will, either by closing the drawer or by depressing a hand lever (in which event the drawer may be left open), the main operating lever 18 is rigidly mounted on the shaft 2ª and is similar in construction and function to that shown in my applications 28,740 and 59,413, except that the manually operated extension 18ª in this application is removable and may be entirely removed and dispensed with when an exclusively drawer operated machine is desired.

*Drawer mode of operation.*—To adapt the machine for operation by the drawer, the main operationg lever 18 is provided with a foot 18ᵉ, said foot being at the lower end of the extension 18ᶠ of said lever and being engaged by a roller 19 that is journaled in the rear end of the cash drawer 13. When the operating parts of the machine are in normal position, the yokes 17 are supported by the rear arm of the lever 18, which is held against movement by a latch plate 20. This latch plate, which is pivoted on a rod 21, is provided with a hook 20ª that is adapted to engage a stud 22 on the forward arm of the operating lever 18, being pressed against the same by a spring 20ᵇ. When the keys have been operated in the usual manner, the hook 20ª is disengaged from the stud 22 and the cash drawer is released, as will be hereinafter more fully described. This leaves the lever 18 free to oscillate the shaft 2ª and permits the spring operated yokes 17 to assume positions corresponding to the values and to the positions in the keyboard of the keys that have been depressed. When the drawer is released, it is thrust forward by the spring 23 in the usual manner, the drawer being by the foot 18ᵉ of the lever 18. When the drawer is closed, the roller 19, bearing against the foot 18ᵉ, lifts the lever 18 and the yokes 17, and moves the stepped sectors 3 and type sectors 15 to their normal positions.

*Combined hand lever and drawer mode of operation.*—When, however, it is desired to operate the register with the drawer open, the hand lever 18ª is connected to the forward end of the lever 18. This hand lever is hooked around the shaft 2ª and is normally held in its most elevated position by a spring 24 that extends from it to the rod 25. To return the initially operated parts, this hand lever is drawn down, whereupon it engages with a lug 26, that extends laterally from the forward end of the main operating lever 18, and thus draws the latter to its normal and locked position. As the hand lever 18ª approaches the end of its downward travel, a stud 18ᵇ thereon contacts with a finger 20ᶜ on the lock plate 20 and forces the lock plate hook 20ª into engagement with the pin 22, making thereby a positively operating lock. When the hand lever is released it is returned to its upper and normal position by the retraction of the spring 24, in which position it is very accessible and affords convenient means for effecting a rapid operation of the machine.

While the roller 19 is maintained in position for engagement with the foot 18ᶜ of the main operating lever, the parts that were displaced upon the release of the drawer and hand lever may be returned by either the drawer or lever. From this it follows that, with the parts assembled as above described, the machine may be operated either by the drawer or by the hand lever.

Figures 7, 8:
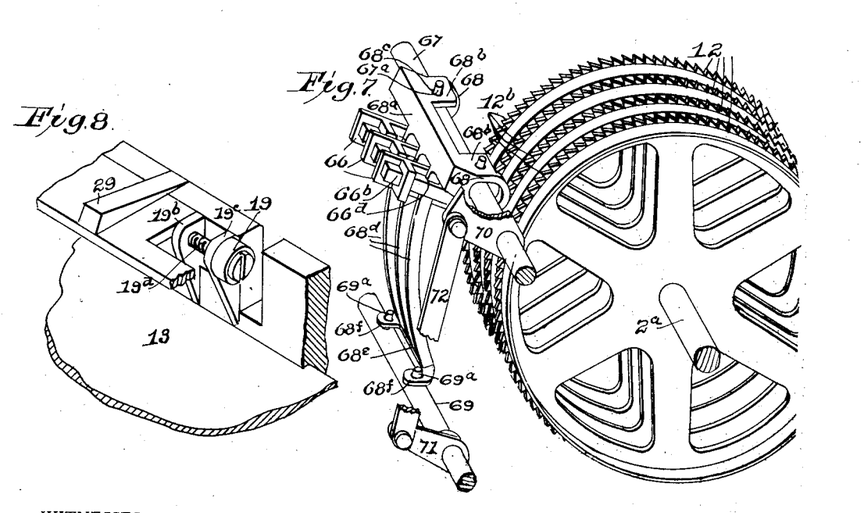
Fig. 7 is a perspective view of the adding wheels and their operating mechanism.
Fig. 8 is a perspective view of a portion of the cash drawer showing the catch and the trust roller in the position provided when the machine is desired to be "drawer operated.

*Hand lever mode of operation.*—When it is preferred to operate the machine exclusively by the hand lever the roller 19 is removed from the path of the foot 18ᶜ, in which position it is shown in Fig. 8, and is placed between the ears 19ᵇ and 19ᶜ on the cash drawer, the pin 19ᵈ being screwed in so as to avoid the foot 18ᶜ of the operating lever 18.

*To release the drawer.*—When the drawer 13 is pushed in, it is engaged and locked by the lock pawl 27, which engages the catch 29, the drawer being released in the following manner: Projecting laterally from the lock pawl 27 is a lug 27ª which is engaged by an arm of the lever 30 that is pivoted on the shaft 31. The opposite end of the said lever 30 projects forwardly and is engaged by a hook 32ª on the detent latch 32 of the bank of department or release keys. Said detent latch plate 32 is pivoted on the shaft 33 and is caused to oscillate rearwardly when a department release key is depressed, a cross pin 11ª of any of the release keys 11 engaging the detent latch plate of the department bank. The oscillation of the detent latch plate 32 oscillates the lever 30 so that the rear end thereof, engaging the lug 27ª, lifts the pawl 27 out of engagement with the catch 29, when the drawer is free to be thrust forward by the spring 23. The department release keys 11 are locked against depression, however, until a key in the value bank and a key in the initial bank are depressed; and the no-sale key 11ᵇ is undepressible until a clerk's initial key 10 has been depressed. The no-sale key is also locked against depression when a value key 9 is depressed, as will hereinafter appear. The construction and operation of the several banks of keys are as follows:

*Value keys.*—The key frames 34 of the value bank are supported on rods 21 and 35 and they contain the keys 9, the same being set radially from the shaft 2. The said keys 9 have cross pins 9ª projecting laterally through slots in the frames 34 in the usual manner in this type of machine. Adjacent to each frame 34 is a detent plate 36 whose outer edge is concentric to and immediately inside the line of cross pins 9ª. Each of these plates is guided in a slight rotary movement about the shaft 2 by pins 34ª in the frame 34 which enter concentric slots 36ᵇ in the detent plates. Each plate is also provided with a series of hooks or detents 36ª, there being one of such hooks for each cross pin 9ª. The forward ends of these hooks are blunt, or are formed with faces that extend at substantial right angles to the lines of movement of their respective keys.

Lying adjacent to each of the detent plates 36 is a latch plate 38, which also has its forward edge concentric to and in position to be engaged by the cross pins 9ª. Said latch plate 38 has a slight rotary movement on the rod 33, being held in contact with the cross pins 9ª by a spring 38ª that connects the upper end of the latch plate 38 to a rod 39. Pivoted on a rod 31 is a series of levers 40, there being one lever for each vertical row of value keys. Each of said levers has a face 40ª at its outer end that is adapted to be engaged by a stud 38ᵇ on the corresponding latch plate 38, whereby the lever 40 is caused to rotate on the shaft 31 when the latch plate is thrust rearwardly by the depression of a key 9. The said lever 40 is bent laterally beyond the shaft 31, and thence forwardly, thus forming a second series of levers 40ᵇ, each of which has a hook 40ᶜ that is adapted to engage with a stud 3ª projecting laterally from the corresponding stepped sector 3, thus holding said sector against rotation when the yoke 17 of that bank is left unsupported during the movement of the main operating lever 18. The depression of a value key in any row of the key bank releases the corresponding sector by lifting the hook 40ᶜ from the stud 3ª.

Figure 3:
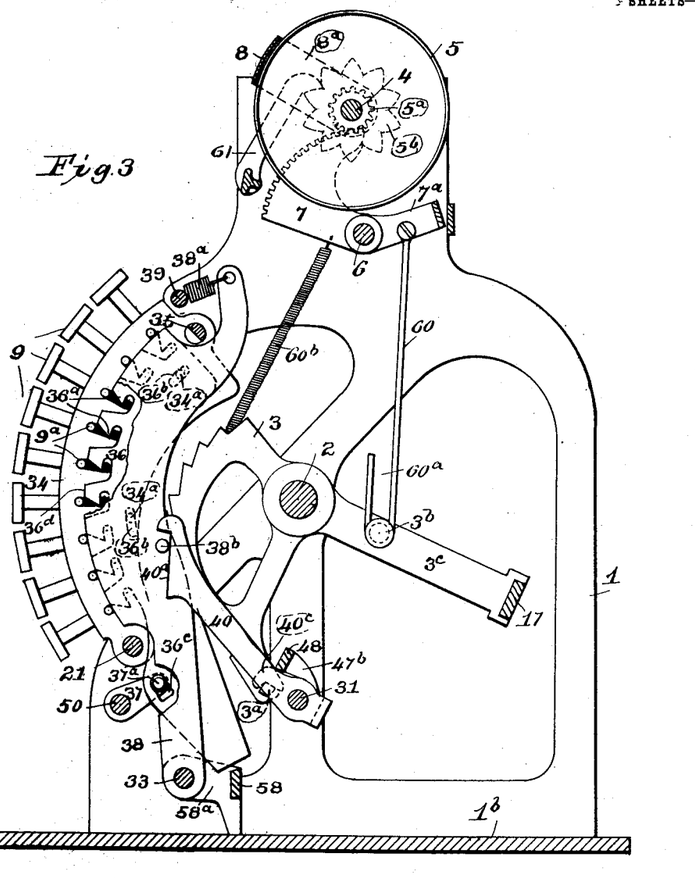
Fig. 3 is a view of the right hand side of one of the banks of value keys, showing the detent and latch plates with their connections.

Each of the detent plates 36 is provided near its lower end with a slot 36ᶜ, in which operates a pin 37ª on an arm 37, said arms being connected to a rock-shaft 50. There is one of these arms for each of the detents and the latter are usually held by these pins in the position shown in Fig. 3, so that the cross pins 9ª of the keys may pass below the hooks 36ᵈ and be caught thereby in a releasable position. When, however, the shaft 50 is rocked to lower the detent plates, as hereinafter described, the blunt faces of the hooks 36ᵈ will be brought into position for intercepting the undepressed pins in the other keys of the bank, whereby all such undepressed keys are securely locked against operation.

*Clerks' initial keys.*—The clerk's initial key bank is similar to that of the value keys, with the exception that the detent plate 41 has a stud 41ª projecting laterally from it near its upper end into an angular shaped slot 42ª near the upper end of the initial latch plate 42, the stud resting on the shoulder 42ᵇ of said slot. In this manner the detent plate 41 is sustained in proper relation to the cross pins 10ª instead of upon the stud 43ª on the arm 43, which stud and arm correspond with the studs 37ª and the arms 37 of the value key banks, upon which latter studs and arms the detent plates of the value keys are supported.

Figure 6:
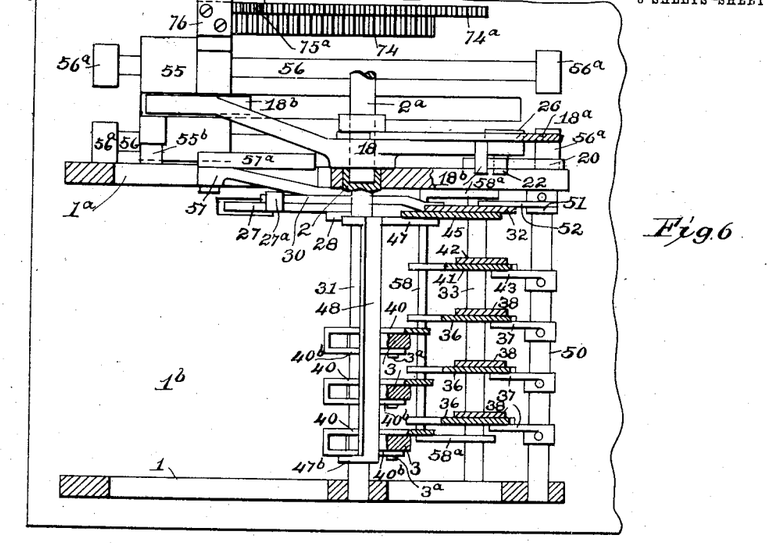
Fig. 6 is a top view of the drawer releasing mechanism.

*Department release keys.*—The department bank also consists of a key frame 44, detent plate 45 and a detent latch plate 32. The keys 11 are rendered normally undepressible by having their cross pins 11ª normally contact with the flat periphery 45ª of the detent plate 45. This detent plate is also guided in a slight rotary movement about the shaft 2 by the pins 44ª which enter the slots 45ᶠ, the plate being supported by a stud 47ª that projects laterally from the free end of an arm 47 that is journaled on the rod 31. Said arm 47 is connected by a cross bar 48 (see Figs. 2, 5, and 6) to an arm 47ᵇ that is also journaled on the rod 31 at the left side of the value key bank, said cross bar and arms comprising a yoke. This bar 48 rests on the levers 40ᵇ so that when either of the said levers 40ᵇ is raised by the oscillation of the corresponding latch plate 38 of a value key bank the bar 48 and the arm 47 will also be oscillated sufficiently to bring the beveled faces 45ᶜ of the hooks on the detent 45 into the line of movement of the cross pins 11ª. Mounted rigidly on a shaft 50, which is journaled in the left end frame 1 and the center frame 1ª, are the rocker arms 37 and 43, hereinbefore referred to. This shaft has, in addition, another arm 51 that is also rigidly attached to it. The arms 37 and 43 have the pins 37ª and 43ª, respectively, which are engaged in the slots 36ᶜ and 41ᵇ in the detent plates 36 of the value bank and 41 of the clerk's initial bank, as before described; but the arm 51 is connected to the latch plate 32 of the department bank by a link 52 so that, as the latch plate 32 of the department bank rotates rearwardly, the arms 37 and 43 will also be caused to rotate slightly in a downward direction. This movement, however, must be preceded by the operation of the value and initial keys, so that the operation of the entire key board is as follows: When a value key 9 is depressed, the slot 36ᶜ permits the detent plate 36 corresponding to said key to be raised sufficiently to permit the cross pin 9ª on the key to pass the point of its respective hook 36ª. The plate then drops by gravity until it rests again on the pin 37ª. In this position any other key in the same bank may be depressed, which operation will result in releasing the key already depressed. The bar 48 is also raised, as before described. When an initial key 10 is depressed, its cross pin 10ª presses the shoulder 42ᵇ from under the stud 41ª, and the initial detent plate 41 is thus allowed to drop until the top of the slot 41ᵇ rests on the stud 43ª on the rock arm 43. The remaining keys 10 are now rendered inoperative, as their cross pins 10ª are then in front of the flat faces 41ᶜ of the detent plate. The detent plate 45 having been raised by the oscillation of the arm 47, as before described, a key 11 may now be depressed. In so doing the cross pin 11ª, pressing against the detent latch plate 32 causes it to rotate rearwardly which rotates the shaft 50 through the link 52 and arm 51. The said rotation of the shaft 50 also carries with it the arms 37 and 43, whereby the detent plates 36 and 41 of the value and initial banks are dropped so that the flat faces 36ᵈ of the detent plate 36 is brought before the cross pins 9ª, thus rendering the remaining value keys inoperative. The detent plate 41 is now supported by the stud 41ª resting on the lower end of the slot 42ª and the stud 43ª has moved toward the upper end of the slot 41ᵇ.

*Operating lever release.*—Projecting from the side of the department latch plate 32 is a stud 32ᶜ for engaging with the front edge of the operating lever latch plate 20; and, as the latch plate 32 is pressed rearwardly by a cross pin 11ª, the stud 32ᶜ presses the latch plate 20 rearwardly so that the stud 22 on the operating lever 18 is released from the hook 20ª, thus permitting the lever 18 to oscillate the shaft 2ª. The rearward oscillation of the detent latch plate 32 also causes the hook 32ª thereon to bear down upon the end of the lever 30 and thus raise the latch pawl 27 and release the drawer.

*Full stroke device for release keys.*—When the department detent latch plate 32 is forced rearwardly, a stud 32ᵈ, projecting laterally therefrom and having its lower face in the form of a knife edge, travels along the upper notched edge of a lug 53ª which projects from the side of a lever 53. This lever is pivoted at 54 on the center frame 1ª, and is yieldingly supported in a horizontal position by a spring 53ᵇ so that, when a key 11 is partly depressed, the knife edge of the stud 32ᵈ engages with the notches on the lug 53ª and prevents the return of the detent latch plate 32 to its normal position until it completes a full stroke, when the lug rises and permits the stud to pass below the same as the detent latch plate 32 returns to its normal position.

*To prevent manipulation of department keys.*—When the detent latch plate 32 is forced rearwardly by a cross pin 11ª, the projections 32ᵉ on the forward edge of the said latch plate are elevated so as to extend in the rear of the undepressed cross pins 11ᵃ and in front of the depressed cross pins, thus locking the former against depression and the latter against return until the stud passes the lug 53ᵃ.

The pendent arm 18ᶠ from the main operating lever 18 is provided with a slot 18ᵈ, which embraces a pin 55ᵃ in a block 55 that is adapted to slide forward on two parallel rods 56, said rods being supported in upright flanges or posts 56ᵃ on the top plate 1ᵇ. The said block 55 has a roller 55ᵇ journaled on one side thereof which roller is adapted to move forwardly beneath a by-pass pawl 57ᵃ that is pivoted on the rear end of the resetting lever 57, and rearwardly on the top of the said pawl, so as to depress the said lever. The lever 57 is pivoted on the screw 28. To lift the detent plates for releasing the depressed keys, the lever 57 is also provided with a nose or shoulder 57ᶜ that projects under a bar 58 so as to be in position for lifting the same. The said bar 58 is connected at each end to arms 58ᵃ that are journaled on the shaft 33, and it is adapted to engage the lower ends of the detent plates 36, 41, and 45. Thus it will be seen that, as the main operating lever 18 is returned to normal position, either by drawing down the hand lever 18ᵃ or by closing the drawer 13, the sliding block 55 is moved rearwardly, the lever 57 is oscillated, as hereinbefore described, and the detent plates 36, 41 and 45 are raised high enough to allow the cross pins 9ᵃ, 10ᵃ and 11ᵃ to escape from their several detents by which they were engaged; then, when the roller 55ᵇ passes off the pawl 57ᵃ and allows the lever 57 to oscillate in the opposite direction, the detent plates that have been raised by the bar 58 drop to their normal positions. The latch plates 38, 42 and 32 are returned by the springs 38ᵃ to their normal position against the cross pins of the several banks of keys.

*No sale key.*—The above description of the construction and operation of the department key bank only included keys 11, or those having to do with general merchandise transactions, such as "cash" sales, money "received on account" goods "charged" and money "paid out", all of which require the use of a value key 9 as well as an initial key 10 (without predetermining sequence of operation) to render them operative. The remaining key—11ᵇ,—called the "no sale" or "change" key,—however, is normally depressible so far as the value keys 9 are concerned, as its cross pin 11ᵃ is in line with the inclined face of its corresponding hook 45ᶜ; but, when the detent plate 45 is raised by depressing a value key 9, the flat edge 45ᵃ of the detent plate 45 is brought opposite the said cross pin 11ᵃ and the no-sale key is thereby rendered undepressible. It is necessary, however, that an initial key 10 be depressed before the key 11ᵇ can be operated, for the following reasons: The depression of the no-sale key causes the oscillation of the department latch plate 32. This, in turn, must cause the shaft 50 to rock. If, therefore, this shaft be held, or if it be prevented from moving a distance sufficient to permit the cross pin 11ᵃ of the no-sale key to pass its corresponding hook on the detent plate 45, the key will be locked out of operation.

Figures 4, 5, 9:
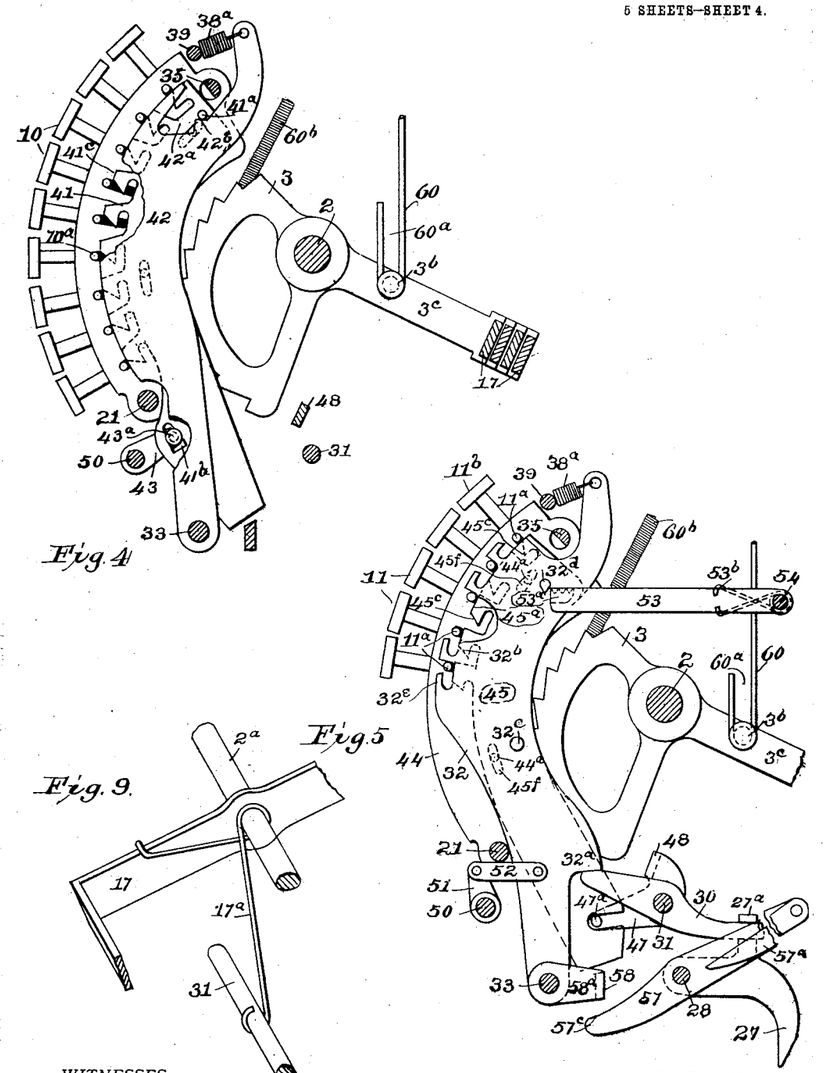
Fig. 4 is a similar view of the bank of clerk's initial keys.
Fig. 5 is a similar view of the bank of department release keys.
" Fig. 9 is a detail of a part of an operating yoke showing the spring that actuates it to initial position.

By reference to Fig. 4, it will be seen that the pin 43ᵃ is normally near the middle of the slot 41ᵇ. When, however, an initial key 10 is depressed and the pin 41ᵃ drops into the recess 42ᵃ, the initial detent plate falls until the pin 43ᵃ rests in the upper end of the slot 41ᵇ. Prior to this movement of the initial detent plate, the shaft 50 could not rock far enough to permit the no-sale key to be depressed; but, after such movement, the pin 43ᵃ has the full length of the slot 41ᵇ for its movement, which permits the shaft to rock fully and thus provides for the free movement of the department detent plate, so that the no-sale key can be depressed. This feature of the interlocking mechanism between the clerk's and the release keys is also operative when any of the release keys 11 is depressed. That is to say, before any release key 11 or 11ᵇ can be depressed a distance sufficient to release either the main operating lever 18 or the cash drawer, its depression must have been preceded by the operation of a clerk's initial key.

*Indicator.*—Each of the revolving targets or indicators 5, which are mounted on the shaft 4, has a pinion 5ᵃ rigidly secured thereto, which pinion meshes with a geared sector 7 that is mounted on the shaft 6. Each sector 7 has a rearwardly extending arm 7ᵃ, to which is connected a link 60 that is loosely attached to a stud 3ᵇ on the rear arm 3ᶜ of the corresponding stepped sector 3, so that, when the operating mechanism has been released by the operation of the various keys, the oscillation of the sectors 3 to the positions that are controlled by the depressed keys, carries around the indicators into position for exhibiting an indication that corresponds with the keys depressed. The slot or loop 60ᵃ in each of the links 60 allows the return of the stepped sector 3 to its normal position independently of the indicator, the spring 60ᵇ connecting the sectors 3 and 7, being put in tension as the stepped sector is returned to normal position by the closing of the drawer or by the operation of the hand lever 18ᵃ. The indicators are retained in their set positions by pawls 61 which are mounted on a shaft 62 and which engage with star wheels 5ᵇ that are rigidly secured to the respective indicators 5. The tension of the spring 60ᵇ is sufficient to always maintain the stud 3$^b$ in the lower end of the loop 60$^a$ unless the indicators are locked by their pawls 61. By using a spring of sufficient strength for this purpose, no overthrow of the indicators is possible, and the use of complicated mechanism for locking and unlocking the indicator operating devices and the stepped sectors is rendered entirely unnecessary. The indicators are released by the oscillation of the shaft 62, which is effected by the lever 63, said lever being secured to the shaft 62 and being swung rearwardly when the stud 63$^a$ thereon is set free by the oscillation of the main operating lever 18.

Figures 2, 2A:
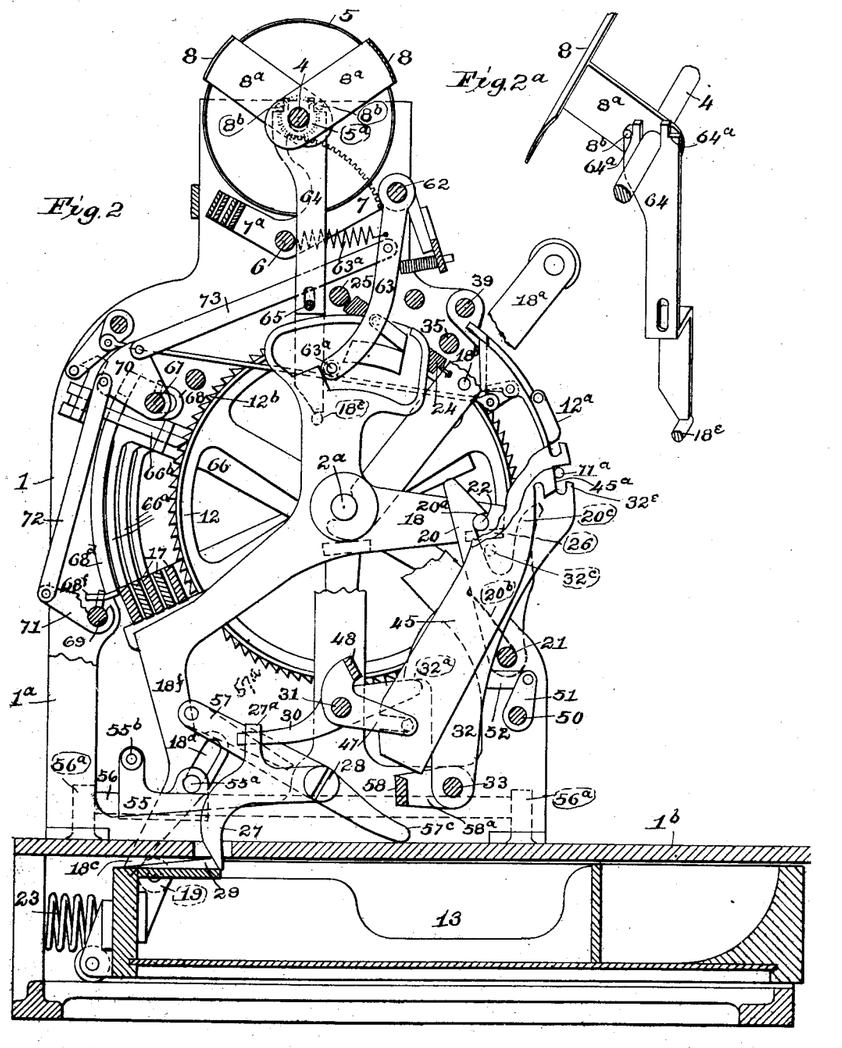

*Screen.*—It has been found desirable to screen the indicators from view during their movements so that the operator cannot arrest the indicators and cause them to show any other registration than that actually made by the keys depressed, such false indications causing the customer to be deceived. For this purpose I provide two shutters 8, one to screen those indicators that are read from the front and the other to screen the indicators that are read from the rear. Each shutter is carried by arms 8$^a$ that are journaled on the shaft 4. The arms 8$^a$ at the inner ends of the shutters have each a stud 8$^b$ projecting laterally therefrom which studs rest on the shoulders 64$^a$ of a plate 64 (see Fig. 2$^a$). The said plate 64 is bifurcated at its upper end to embrace the shaft 4, and is slotted near its lower end, through which slot passes a pin 65, the rod 4 and pin 65 acting as guides for the plate. The lower end of the plate 64 is partly beveled on one side, and is adapted to normally rest on a stud 18$^e$ that projects laterally from the upper arm of the main operating lever 18, so that, as the lever 18 oscillates rearwardly, the plate 64 and the shutters 8 will drop by gravity to conceal the indicators, where they will remain until the main operating lever 18 is again brought to its normal position, when the stud 18$^e$, bearing against the beveled face of the plate 64, raises it and the shutters to their normal positions. From an inspection of Fig. 2, it will be seen that the devices for releasing the operated keys and for lifting the indicator screens are so timed in their operation that the keys are released before the indications are disclosed.

*Register mechanism.*—Loosely journaled on the shaft 2$^a$ to the right of the operating lever 18 is a series of adding wheels 12 that are provided with peripheral ratchet teeth 12$^b$. Adjacent to each wheel 12 is an operating lever 66 that is also journaled on the shaft 2$^a$ said lever being extended rearwardly beyond the periphery of the wheels 12. Each of the arms 66 is supported on a separate operating yoke 17 by a depending leg 66$^a$. A reciprocating locking bolt 66$^b$ is mounted on each arm 66 and is adapted to slide into and out of engagement with the teeth 12$^b$ on its respective adding wheel. Mounted on a shaft 67 by means of slotted arms 68, is a bar 68$^a$, said bar carrying a web or flange 68$^b$ which extends inwardly from each end of the bar 68, said web having holes 68$^c$ to receive pins 67$^a$ which project from the shaft 67. From the lower edge of the bar 68 depend vertically disposed, parallel bars 68$^d$, said bars having their lower ends connected by a plate 68$^e$. These bars are curved so as to be concentric with the shaft 2$^a$. There is a bar 68$^d$ for each locking bolt 66$^b$ said bars passing through recesses in one side of their respective locking bolts. Extending from each end of the plate 68$^e$ is an ear 68$^f$, each ear having therein a hole through which extends a pin 69$^a$ that projects from the rock shaft 69. Secured to the rock shafts 67 and 69 are arms 70 and 71, respectively, said arms being connected by a link 72. The arm 70 is also connected to the lever 63 by a link 73.

The construction is such that, when the lever 63 is released and is swung rearwardly by the spring 63$^a$, it communicates movement, through the links 73 and 72, to the arms 70 and 71 and to the shafts 67 and 69, so that a parallel movement is transmitted to the bars whereby the bolts 66$^b$ are withdrawn from the teeth 12$^b$. The arms 66, being thus released from the adding wheels, may descend with their corresponding yokes 17. When the main operating lever is again brought to normal position, the lever 63 is swung forwardly, drawing with it the links 73 and 72 and oscillating the arms 70 and 71 and the shafts 67 and 69, thereby forcing the bolts 66$^b$ into locked engagement with the teeth 12$^b$ before which they had stopped in their descent; and, as the yokes 17 are raised, there is effected an advance of the adding wheels 12, corresponding in degree with the values of the keys depressed. The bolts 66$^b$ being thus positively held in engagement with the teeth of the adding wheels which they entered, and being releasable only in the next succeeding operation of the machine, it is evident that it is impossible to cause an overthrow of the counting wheels by a violent operation of the machine.

*Full stroke device for the main operating lever.*—In nearly all forms of cash register construction, it is necessary, after a registration is commenced, that some device be provided to compel a complete performance of the started registration before a second operation of the machine can be effected. For this purpose I have pivoted on a pin 55$^d$ on the sliding block 55, a pawl 55$^e$, said pawl being adapted to travel along and to engage with a stationary rack or ratchet 74, in such a manner that, as the block 55 goes in either direction, the pawl 55c will trip over the rack teeth and thus prevent a reverse movement of the pawl until it reaches the end of its stroke.

*Governor.*—It has been found advisable in machines of this class to provide means for equalizing the operating parts so that there may be no undue stress or wear and tear upon the mechanism. In this construction the main operating lever 18 and the coöperating yokes 17 are moved from their normal positions by the springs 17a.

Figure 1:
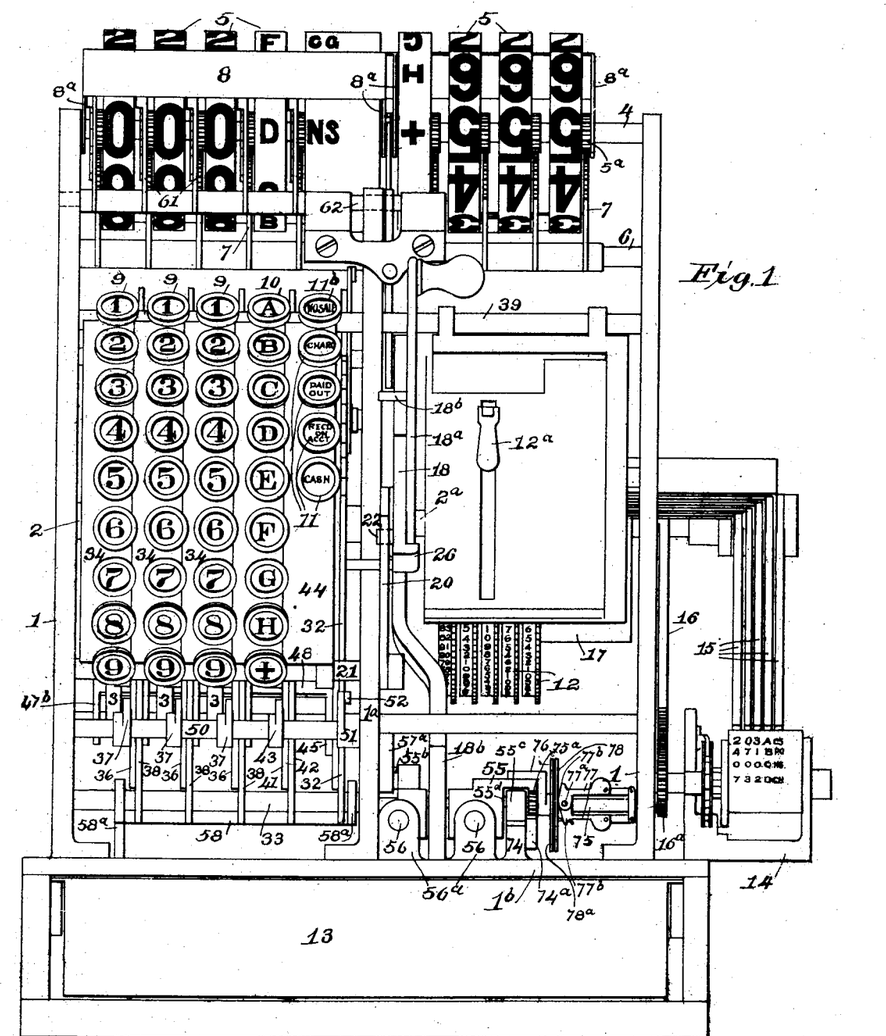
Figure 1 is a front elevation of a cash register, indicator and recorder containing my improvements.
Figure 10:
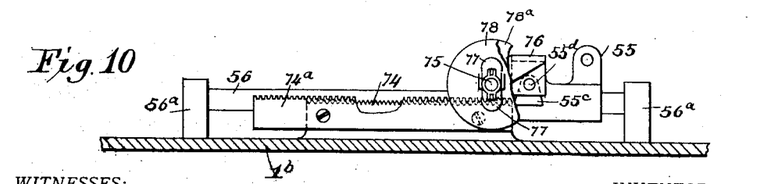
Fig. 10 is a side view of the governor for controlling the speed of operation of the register.

It is obvious that in registering a sale by the keys of lower values, the travel of the yokes 17 is very limited, and that the operating springs 17a transmit little stress or jar upon the transfer or indicating mechanism; but, when the keys of higher values are operated, the movement of the parts referred to is accelerated and considerable momentum is required. In a return of the main operating lever 18 to normal position by the extension hand lever 18a, an ordinary manual movement imparts little or no stress or jar; but, at times competitive salesmen strike a severe blow upon the hand lever when it is part way down, with a view to overthrowing the adding wheels and transfer mechanism, and thereby causing the addition of a larger amount than called for by the keys depressed. To overcome these tricks I use the governor shown in Figs. 1, 6 and 10, which comprises a shaft 75 that is journaled in a bracket 76, which is rigidly secured to the block 55. Secured to said shaft is a pinion 75a the same being so positioned as to mesh with a toothed rack 74a that is secured to the side of the full stroke rack 74. The weighted governor arms 77 are journaled at one end on a pin 77a that passes transversely through the shaft 75, which construction permits the arms to swing outwardly, due to centrifugal force, when the shaft 75 is rotated. The journaled end of each of the arms 77 is formed with a shoulder 77b, which bears against a disk 78 when the arms 77 are thrown outwardly, and presses said disk against a similar disk 78a that is rigidly secured to the hub 76a on the bracket 76. The disk 78 is free to move axially on the shaft 75, but revolves therewith, so that when it contacts with the disk 78a the friction resulting therefrom retards the velocity of the shaft 75 and prevents excessive speed of the sliding block 55. A sudden downward blow imparted to the partly depressed hand lever 18a will cause the arms 77 to spread outwardly and create sufficient friction between the disks 78 and 78a to absorb the impact of the blow and prevent the transmission of its effect to the adding mechanism.

From the foregoing description it will be seen that the interlocking mechanism between the keys of the key board compels the depression of both a value and an initial key before a release key can be operated to effect a transaction involving a sale, and that an initial key must be depressed in advance of the depression of the no-sale key. This feature of the invention is of special value in combination with the printing mechanism, as it insures a record showing what clerk is to be charged with the responsibility of the transaction, whether the latter involves a sale or the mere opening of the cash drawer to make change.

Having thus described my invention, what I claim as new and desire to secure by Letters Patent is:

1. In a cash register, the combination with a register comprising a series of wheels, of a series of levers therefor, bolts mounted on said levers, an operating arm for and engaging each of said bolts, and a pair of rock shafts arranged to reciprocate the operating arms and to thereby lock said bolts to their respective wheels, whereby the overthrow of the register wheels due to a violent operation of the register is prevented.

2. In a cash register, the combination with a register comprising a series of adding wheels, a series of operating levers therefor, bolts mounted on said levers, operating arms for said bolts, and rock shafts adapted to move said arms and bolts positively into and out of engagement with the adding wheels.

3. In a cash register, the combination with a registering mechanism, of a series of movable members, register operating bolts mounted on said members, and an operating member connected with the movable parts of the machine, rock shafts, and movable bolt locking devices mounted on said rock shafts, said bolts and their locking devices being adapted to maintain an operative connection no matter what positions the movable members may take up.

4. In a cash register, the combination with a series of registering wheels, of a series of pivoted levers therefor, operating bolts mounted on said levers, rock shafts, arms mounted on said rock shafts and engaging said bolts, said arms being adapted, upon the oscillation of said rock shafts, to move the operating bolts positively into or out of engagement with the registering wheels.

5. In a cash register, the combination with a series of registering wheels 12, of a series of pivoted levers 66 therefor, bolts 66b mounted on said levers 66, operating arms 68d for said bolts, rock shafts 67 and 69, a link 73, a lever 63, and means for rocking said lever, the said operating arms being adapted, upon the oscillation of shafts 67 and 69, to move the operating bolts 66b positively into or out of engagement with the registering wheels.

6. In a cash register, a registering wheel, a pivoted lever, a bolt carried by said lever for turning the register wheel, rock shafts, an arm carried by said rock shafts, said arm and bolt being adapted for holding the bolt in locked engagement with the register wheel, and means under control of any release key to move the arm and withdraw the bolt from engagement with the wheel, substantially as described.

7. In a cash register, the combination with a main operating member, of a series of adding wheels, a corresponding series of pivoted arms, a bolt for and slidably mounted on each of said arms, each of said bolts being provided with a recess, a pair of rock shafts, means connecting said shafts with the main operating member whereby the shafts are rocked upon the operation of said member, and a series of arms, one for each bolt, connected at their ends with the respective rock shafts, said arms passing through the recesses of the bolts, whereby the latter may be moved toward and from their adding wheels and may be held in locked engagement therewith.

8. In a cash register having a frame, the combination with a series of operating yokes, of a main operating lever for returning said yokes, a shaft upon which said yokes and operating lever are journaled, a hand lever for operating the said lever and the yokes, said hand lever having a hooked end for loose engagement with the shaft, a spring connecting the hand lever with a stationary part of the register frame, whereby the hand lever is normally held in elevated position, and a projection on the main operating lever that is adapted to be engaged by the hand lever when the latter is drawn downwardly, whereby the main operating lever and the yokes are returned to their normal position.

9. In a cash register, the combination with normally depressible value keys, of normally depressible clerk's initial keys, and a department release key that is normally locked against depression and that is operable only after the depression of both a value and a clerk's initial key.

10. In a cash register, the combination with normally operable value setting elements, of normally operable clerk's setting elements, normally inoperable releasing elements for the cash register, and interlocking mechanism for said elements, said mechanism requiring the operation consecutively or simultaneously of both a value and a clerk's setting element before one of said releasing elements can be operated.

11. In a cash register, the combination with normally depressible value and clerk's initial keys, of a department release key, mechanism for normally locking the release key against depression, means for rendering the release key depressible upon the depression of both a value and a clerk's initial key, and means for locking said release key in a partially depressed position.

12. In a cash register, the combination with normally depressible value and clerk's initial keys, of a department release key, mechanism for normally locking the release key against depression, means for rendering the release key depressible upon the depression of both a value and clerk's initial key, devices under control of the release key, and operated upon the depression of the latter, for locking all other keys of the register against movement and means for locking the release key in a partially depressed position, whereby no change can be made in the keyboard after the release key is moved from its normal position.

13. In a cash register, the combination with a series of normally depressible value keys, a series of normally depressible clerk's initial keys and a series of normally undepressible department release keys, of means under control of the value and clerk's initial keys and requiring the depression of a key in each of these series for rendering the release keys depressible, means under control of the release keys and operable upon the depression of any of the latter for locking all the other keys in all the series against subsequent movement and means for locking the release keys in a partially depressed position, whereby no change can be made in the key board after a release key has been moved from its normal position.

14. In a cash register, the combination with a bank of value keys, a bank of clerk's initial keys and a series of department release keys, of a detent plate, said plate normally locking the release keys against operation, means for moving said plate to a predetermined point by the depression of a value key, means for rendering said plate further movable by the depression of a clerk's initial key, whereby the department release key is rendered depressible, and full stroke mechanism for compelling the full depression of a started release key before it can be returned to its normal position.

15. In a cash register, the combination with a series of value keys, a series of clerk's initial keys and a series of department release keys, of a detent plate adjacent said department keys, hooks on said plate adapted to normally lock said release keys against depression, means actuated upon the depression of a value key to move said detent plate and to thus partially unlock the release keys, a second plate that is adapted to be moved by the depression of a clerk's initial key for completing the unlocking of the release keys, a third plate operated by the release keys, and means carried by said third plate to arrest the department keys in partially depressed positions.

16. In a cash register, the combination with a release key, of a detent plate adjacent thereto and normally preventing the depression of said key, a value key adapted upon depression to actuate said detent plate out of interference with said release key, a second plate adjacent said release key, said second plate normally preventing the depression of the release key, a clerk's initial key, and means under the control of said clerk's initial key to release said second plate to permit the depression of the release key, and means carried by said second plate to arrest said release key as progressively depressed, thereby compelling a full depression of that key before it can be returned to normal position.

17. In a cash register, the combination with a release key, of a detent plate adjacent thereto, a hook on said plate, said hook having a flat face that normally prevents the depression of said release key, means to change the position of said plate so that the flat face will not interfere with the depression of said key, a second and normally locked plate adjacent said detent plate, a clerk's initial key, means under the control of said clerk's initial key to release said second plate, and means carried by said second plate to arrest said release key in progressively depressed positions whereby a full stroke of said release key is required before it can be returned to normal position.

18. In a cash register, the combination with a release key and a cross pin thereon, of a detent plate adjacent said key and adapted to be actuated by the cross pin when the key is depressed, a hook on said plate normally in contact with said cross pin to prevent the depression of said key, means for moving said hook out of engagement with said cross pin, a normally locked latch plate adjacent said key and adapted to be actuated thereby, means for releasing said latch plate, a hook carried by said latch plate and adapted to engage the cross pin upon said key and means coöperating with said latch for arresting said key in partially depressed position.

19. In a cash register, the combination with a release key having a cross pin thereon, of a detent plate normally in engagement with said cross pin and preventing the depression of said key, means for removing said plate from said engagement, a normally locked latch plate adjacent said key, means for releasing the same, a hook on said latch plate adapted to engage the cross pin on said key and hold said key in depressed position, said latch plate being adapted to be moved inwardly by the depression of said key, and means to arrest the said plate at points of its inward travel and to compel a full depression thereof.

20. In a cash register, the combination with a release key having a cross pin thereon, of a detent plate adjacent said key and adapted normally to prevent the depression thereof, means actuating said plate to permit the depression of said key, means carried by said plate to hold said key in its extreme depressed position, a normally locked latch plate adjacent said key, means for releasing said latch plate, a hook on said latch plate, said latch plate being adapted to be moved inwardly by the depression of said key, whereby said hook engages said cross pin to prevent the retraction of said key, and means adapted to prevent the return of said plate until the same has reached the limit of its inward travel.

21. In a register, a keyboard having three keys, two members adjacent the first of said keys, both of said members being normally immovable by the first key so that the latter is locked against depression by both of said members, means under control of the second key for rendering one of said members movable by the first key and means under control of the third key for rendering the other member movable by the first key.

22. In a cash register, the combination with a release key having a cross pin thereon, of a detent plate adjacent said key adapted normally to engage said cross pin to prevent the depression of said key, means for moving said plate to permit the depression of said key, a normally locked latch plate adjacent said key, means for releasing the same, a hook on said latch plate, said latch plate being adapted to be actuated by the depression of said key whereby said hook engages said cross pin, and means for arresting said latch plate at one or more points of its inward travel whereby the retraction of said key is prevented until it has reached its extreme inward movement.

23. In a cash register, the combination with a release key having a cross pin thereon, of a detent plate adjacent said key and normally preventing the depression thereof, means for moving said detent plate to permit the depression of said key, a normally locked latch plate adjacent said key and adapted, when released, to be actuated thereby, means for rendering said latch plate operable by said key, a hook on said latch plate adapted to engage the cross pin of said key to prevent retraction of the same, a pin on said plate, and a rack adapted to be engaged by said pin whereby a complete stroke of said key is required before the same may be retracted.

24. In a cash register, the combination with a release key having a cross pin thereon, of a detent plate adjacent said key and adapted normally to prevent depression thereof, means for actuating said plate to permit the depression of said key, a normally locked latch plate adjacent said key and adapted, when released, to be actuated thereby, means for releasing said latch plate, a hook on said latch plate adapted to engage the cross pin on said key to prevent retraction thereof, a pin on said plate, and a spring controlled rack with which said pin is adapted to engage as the plate is forced inwardly by the depression of the key, whereby said plate is arrested at one or more points, thereby preventing the retraction of said key until it has been completely depressed.

25. In a cash register, the combination with a no-sale key having a cross pin thereon, of a normally locked latch plate adjacent said key with which said cross pin engages, means for releasing said latch plate to permit the depression of said key, means carried by said latch plate adapted to engage the cross pin on said key as the latter is depressed, and means adapted to arrest said latch plate at intermediate points on its inward travel, whereby the retraction of said no-sale key prior to its complete depression is prevented.

26. In a cash register, the combination with a bank of department release keys, of a detent plate adjacent said bank and normally preventing the depression of said department keys, a no-sale key in said bank arranged to be normally out of engagement with said detent plate, a normally locked latch plate adjacent said bank, means for releasing said latch plate whereby said no-sale key becomes depressible, a hook on said latch plate adapted to engage the no-sale key when the latter is depressed, said latch plate being adapted to be forced inwardly by the depression of said no-sale key, and means for arresting said latch plate at one or more points of its inward travel whereby, after the depression of said key is begun, retraction is prevented until said key has reached the limit of its depression.

27. In a cash register, the combination with a bank of department release keys, of a no-sale key arranged in said bank, a cross pin on said no-sale key, a latch plate normally operating to prevent the depression of said no-sale key, a clerk's initial key adapted, upon being depressed, to release said latch plate, the latter being adapted to be forced inwardly by the depression of said no-sale key, a hook on said latch plate adapted to engage the cross pin on said no-sale key, a pin on said plate, and a rack with which said pin is adapted to engage to hold said plate in partially operated positions, whereby the retraction of said no-sale key is prevented until a complete stroke thereof has been made.

28. In a cash register, the combination with normally depressible value keys, of normally depressible clerk's initial keys, normally undepressible department release keys, said latter keys being rendered depressible only by the prior depression of both a value key and a clerk's initial key, a no-sale key rendered depressible by the prior depression of a clerk's initial key but prevented from being depressed by the prior depression of a value key, and means for arresting said department or no-sale key at one or more points of the inward travel thereof, whereby a full stroke of said department or no-sale key is compelled after the depression thereof has been commenced.

29. In a cash register, the combination with an accounting mechanism, a normally locked operating member therefor, depressible value keys for controlling the said mechanism, hooked detents for holding the keys in their depressed positions, means for releasing the operating member, and connections between the releasing means and the detents for normally holding the latter in position for permitting the operation of the value keys but adapted to cause the detents to move from their normal positions upon the initial movement of the releasing means, whereby the detents then prevent the depression of other value keys.

30. In a cash register, the combination with an accounting mechanism, of a normally locked cash drawer slidably mounted in the register, means operated by the drawer for actuating the accounting mechanism, selecting devices for controlling the said mechanism, detents for holding the selecting devices in their operated positions, means for releasing the cash drawer, and connections between the releasing means and the detents for normally holding the latter in position for permitting the operation of the selecting devices, but adapted to cause the detents to move from their normal positions upon the initial movement of the drawer releasing means, whereby the detents then prevent the operation of additional selecting devices.

31. In a cash register, the combination with a registering device, of a normally locked cash drawer slidably mounted in the register, means connecting the cash drawer with the registering device for operating the latter from the drawer, value keys for controlling the operation of the registering device, detents for holding the keys in their operated positions, a key for releasing the cash drawer, and connections between the releasing key and the detents for normally holding the latter in position for permitting the operation of the value keys, but adapted to cause the detents to move from their normal positions upon the initial movement of the releasing key, whereby the detents then prevent the operation of additional value keys.

32. In a cash register, the combination with an accounting mechanism, of a normally locked operating member therefor, depressible value keys for controlling the said mechanism, detents for holding the keys in their operated positions, a release key for releasing the operating member, a pivoted member upon which the detents normally rest, means for normally holding the pivoted member in position for permitting the depression of the keys, and means connected with the release key for moving said pivoted member and thus permitting the detents to move into positions for preventing the depression of additional keys.

33. In a cash register, the combination with an accounting mechanism, of a normally locked operating member therefor, depressible value keys for controlling the operations of said mechanism, detent plates having hooks for engaging with the depressed keys and holding the latter in their operated positions, said hooks having blunt noses, a series of department keys, means controlled by said department keys for releasing the operating member, and connections between the department keys and the detents for normally holding the blunt portions of the noses out of the path of the value keys so that the latter may be freely depressed but adapted to cause the detents to move from their normal positions upon the initial movement of either of the department keys, whereby the blunt noses assume positions for interfering with and preventing the depression of additional value keys.

34. In a cash register, the combination with an accounting mechanism, of a normally locked operating member therefor, depressible value keys for controlling the operations of said mechanism, detent plates having hooks for engaging with the depressed keys and holding the latter in their operated positions, said hooks having blunt noses, a release key for the operating member, and connections between the release key and the detents for normally holding the blunt portions of the noses of the hooks out of the path of the value keys so that the latter may be freely depressed but adapted to cause the detents to move from their normal positions upon the initial movement of the release key, whereby the blunt noses assume positions for interfering with and preventing the depression of additional value keys.

35. In a cash register, the combination with an accounting mechanism, of a normally locked cash drawer for operating said mechanism, depressible value keys for controlling the operation of said mechanism, detents for holding the value keys in their depressed positions, said detents being provided with hooks for engaging with the depressed keys and the said hooks being provided with blunt noses, a release key for the drawer, and connections between the release key and the detents for normally holding the blunt noses of the hooks out of engagement with the value keys but adapted to permit the detents to move from their normal positions upon the initial movement of the release key, whereby the said blunt noses are brought into position for intercepting and preventing the depression of additional value keys.

36. In a cash register, the combination with an accounting mechanism, of a normally locked cash drawer for operating said mechanism, depressible value keys for controlling the operation of said mechanism, detents for holding the value keys in their depressed positions, said detents being provided with hooks for engaging with the depressed keys, and the said hooks being provided with blunt noses, a series of department keys, means controlled by said keys for releasing the drawer, and connections between the department keys and the detents for normally holding the blunt noses of the hooks out of engagement with the value keys but adapted to permit the detents to move from their normal positions upon the initial movement of either of the department keys, whereby the said blunt noses are brought into position for intercepting and preventing the depression of additional value keys.

37. In a cash register, the combination with an accounting mechanism, of a normally locked operating member therefor, normally depressible value keys for controlling the operations of said mechanism, detent plates having hooks for engaging with and holding the depressed keys in their operated positions, said hooks having blunt noses, a release key for the operating member, a detent plate having a hook for holding the release key in operated position, said hook having a blunt nose, means for normally holding the blunt noses of the value key detent plates in position for permitting the free depression of the value keys; means for normally holding the blunt nose of the release key detent plate in position for intercepting with and locking the release key, mechanism for causing the operation of a value key to move the release key detent so as to permit the depression of the release key and mechanism for causing the operation of the release key to move the value key detents so as to lock all of the value keys against subsequent movement.

38. In a cash register and indicator, the combination with a series of keys, means for locking said keys when depressed, a series of operating yokes, a series of indicators connected with said yokes, springs for moving the yokes and indicators in one direction, a hand lever, a drawer, means connecting the hand lever and the drawer with said yokes, whereby the yokes may be moved in the opposite direction by either the hand lever or the drawer, a screen for the indicators, means for releasing the depressed keys, and means for moving the screen to expose the indicators to view after the keys have been released.

39. In a cash register of the class described, the combination with a shaft 4, of indicator wheels 5 mounted on said shaft, a screen 8 extending across the face of said indicators, said screen having arms 8ª journaled on said shaft 4, a stud 8ᵇ extending laterally from one of the said arms 8ª, a bar 64 guided by the shaft 4 said bar 64 having shoulders 64ª adapted to engage with and support the stud 8ᵇ, an operating lever 18, and a stud 18ᵉ projecting laterally from the operating lever and adapted to engage with and support the lower end of said bar 64 and impart thereto a vertical reciprocating movement by which the screen is caused to oscillate on the shaft 4, for the purpose described.

40. In a cash register, the combination with a series of indicators, of a screen for concealing the same, value keys, clerk's initial keys, department release keys, and interlocking mechanism between said keys, said mechanism requiring the operation of a value, an initial and a department release key before the screen can be moved to expose the indicators and thus indicate a sale transaction.

41. In a cash register, the combination with registering and indicating mechanisms, of a series of value keys, a series of clerk's keys and a series of department keys, an operating member for said mechanisms, alternative means for actuating the operating member, a screen for the indicators, interlocking devices between the keys requiring the operation of a value, initial and department key before the operating member can be moved to actuate the register, means for moving the screen to expose the indicators, and means for releasing the operated keys, the means for exposing the indicators being operated after the release of the keys.

42. In a cash register and indicator, the combination with a series of indicators, of a screen for the indicators, value keys, clerk's keys and department release keys, in combination with interlocking mechanism for the same, of means to compel the depression of a value key, clerk's key and department release key, and the return of each to normal position before the screen can be caused to expose the indication of a sales transaction.

43. In a cash indicating machine, the combination with a series of value keys, of a series of clerk's initial keys, a series of department keys, a normally locked operating hand lever, means requiring the operation of a key in each series for releasing the hand lever, an indicating device, a screen for said device, a sliding bar connected with said screen, and means operated by the hand lever for actuating the screen and exposing the indicator.

44. In a cash register, a normally locked main actuating device, an indicating mechanism, a series of clerk's initial keys, a series of department keys, a cash drawer, a hand lever, connections between the cash drawer and the actuating device such that the said device may be actuated by either the drawer or the hand lever, means requiring the actuation of both a clerk's initial and a department key for unlocking the actuating device, a screen for the indicating mechanism, a sliding bar connected with the screen, and means operated by the main actuating device for operating the screen as the said device is returned to normal position.

45. In a cash register, the combination with a series of value keys, a series of clerk's initial keys and a no-sale key, of a series of indicators, connections between the keys and the indicators for controlling the latter, a screen for the indicators, a main operating member, alternative means for actuating the operating member, means connected with said operating member for actuating the screen, means for normally holding said member from operation, means operated by the no-sale key for releasing said member, interlocking mechanism between the keys requiring that all value keys be in their unoperated positions and that a clerk's initial key be in its operated position before the no-sale key can be operated, and means for releasing the operated keys, the keys being released before the indicators are exposed.

In testimony whereof I affix my signature in the presence of two witnesses.

HENRY S. HALLWOOD.

Witnesses:
  EMILIE SMITH,
  G. M. GRIDLEY.

Copies of this patent may be obtained for five cents each, by addressing the "Commissioner of Patents, Washington, D. C."